US012804348B2

(12) United States Patent
Alasti et al.

(10) Patent No.: US 12,804,348 B2
(45) Date of Patent: Nov. 17, 2026

(54) NETWORK SLICING FOR MULTI-TENTANT LOCATION BASED SERVICES IN A WIRELESS TELECOMMUNICATION NETWORK

(71) Applicant: Boost SubscriberCo L.L.C., Englewood, CO (US)

(72) Inventors: Mehdi Alasti, Reston, VA (US); Kazi Bashir, Lewisville, TX (US); Jingyi Zhou, Belle Mead, NJ (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 842 days.

(21) Appl. No.: 18/070,287

(22) Filed: Nov. 28, 2022

(65) Prior Publication Data

US 2024/0179489 A1 May 30, 2024

(51) Int. Cl.
*H04W 4/02* (2018.01)
*H04W 48/18* (2009.01)

(52) U.S. Cl.
CPC ............ *H04W 4/02* (2013.01); *H04W 48/18* (2013.01)

(58) Field of Classification Search
CPC ................................ H04W 4/02; H04W 48/18
See application file for complete search history.

(56) References Cited

U.S. PATENT DOCUMENTS 11,645,182 B2 5/2023 Mccrory et al.
2017/0343360 A1 11/2017 Harikrishnan et al.
2018/0359337 A1* 12/2018 Kodaypak ........... H04L 12/1886
2019/0285722 A1 9/2019 Markhovsky et al.
2019/0335295 A1 10/2019 Jamkhedkar et al.
2021/0144790 A1 5/2021 Faccin et al.
(Continued)

OTHER PUBLICATIONS

X. Li et al., "5G-Crosshaul Network Slicing: Enabling Multi-Tenancy in Mobile Transport Networks," in IEEE Communications Magazine, vol. 55, No. 8, pp. 128-137, Aug. 2017 (Year: 2017).
(Continued)

*Primary Examiner* — Charles N Appiah
*Assistant Examiner* — Nicole M Louis-Fils

(74) *Attorney, Agent, or Firm* — Jeremiah J. Baunach; Frontier IP Law PLLC

(57) ABSTRACT

Example embodiments are directed towards network slicing for multi-tenant location based services in a wireless telecommunication network. For each tenant of the plurality of tenants of the network, the system receives a request from the tenant for location based services for mobile devices of the tenant operating on the respective network slice defined for the tenant. In response to the request, the system provides the customized location based services to the tenant based on the respective network slice being associated with one or more location based services network functions or location based services systems of the wireless telecommunication network, which provide geographical locations of mobile devices operating on the wireless telecommunication network. The location based services network functions or location based services systems may include the location management function (LMF) and the Gateway Mobile Location Centre (GMLC) gateway node.

17 Claims, 7 Drawing Sheets

(56) References Cited

U.S. PATENT DOCUMENTS

| | | | | |
|---|---|---|---|---|
| 2021/0360371 | A1 | 11/2021 | Qiao et al. | |
| 2022/0110086 | A1* | 4/2022 | Singh | H04W 48/18 |
| 2022/0159605 | A1* | 5/2022 | Li | H04W 76/10 |
| 2022/0386399 | A1* | 12/2022 | Huang | H04W 4/029 |
| 2023/0140034 | A1 | 5/2023 | Bui et al. | |
| 2023/0276211 | A1* | 8/2023 | Kozlova | H04W 4/50 455/224 |
| 2023/0345516 | A1 | 10/2023 | Cai et al. | |

OTHER PUBLICATIONS

Mehdi Alasti et al., "Multi-Tenant Architecture for Position Location Service (PLS)," U.S. Appl. No. 18/091,184, filed Dec. 29, 2022. (42 Pages).
"The 5G Evolution: 3GPP Release 16-17," 5G Americas, Jan. 2020. (54 pages).
"What is multi-tenant?," IBM Newsletter; https://www.ibm.com/topics/multi-tenant; Accessed Sep. 7, 2023. (6 pages).
Dryjanski, "Introduction to O-RAN," Rimedo Labs, Mar. 10, 2021. (8 pages).
Dryjanski, "O-Ran Architecture, Nodes, and Interfaces," Rimedo Labs, Apr. 1, 2021. (6 pages).
Ghadialy, "The 3G4G Blog: Network Slicing using User Equipment Route Selection Policy (URSP)"; https://blog.3g4g.co.uk/2021/11/network-slicing-using-user-equipment.html; Posted Nov. 11, 2021. (17 pages).
Rcrwireless, "Open Ran 101-RU, DU, CU: Why, what, how, when?" Jul. 8, 2020. (8 pages).
Swales et al., "Direction finding in the cellular land mobile radio environment," 1989 Fifth International Conference on Radio Receivers and Associated Systems, Cambridge, UK, 1990, pp. 192-196. (5 pages).
"5G; 5G System; Gateway Mobile Location Services; Stage 3", ETSI, 3GPP TS 29.515 version 16.1.0 Release 16, Jul. 2020, 37 pages.
"5G; 5G System; Location Management Services; Stage 3", ETSI, 3GPP TS 29.572 version 15.1.0 Release 15, Oct. 2018, 36 pages.
"New SID on Management Aspects of 5G Location", 3GPP TSG-SA5 Meeting #142-e, http://www.3gpp.org/Work-Items, Apr. 4, 2022, 4 pages.
Wikipedia , "5G network slicing", Feb. 16, 2022, 7 pages.

* cited by examiner

NETWORK SLICING FOR MULTI-TENANT LOCATION BASED SERVICES IN A WIRELESS TELECOMMUNICATION NETWORK

BRIEF SUMMARY

Fifth Generation (5G) wireless technology provides a broad range of wireless services delivered to enterprises and the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as location management, firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3GPP develops protocols and standards for telecommunication technologies including RAN, core transport networks and service capabilities. 3GPP has provided complete system specifications for 5G network architecture which is much more service oriented than previous generations. 5G network slicing enables 5G mobile network operators (MNOs) to build and manage their network to meet and exceed the emerging requirements from a wide range of users or enterprises (i.e., tenants) sharing the same physical network resources of the MNO.

In particular, 5G network slicing defines a set of logical networks on top of a shared infrastructure. Each logical network is designed to serve a defined business purpose for a tenant and comprises the network resources, configured and connected end-to-end. Each slice is identified by a slice-ID, which may be Slice Selection Assistance Information (S-NSSAI) in a 5G network. However, many, but not all, of the 5G network functions (NFs) support network slicing. Currently, 3GPP has not yet specified network slicing for location based services systems of a 5G wireless telecommunication network, such as the Gateway Mobile Location Centre (GMLC) gateway node and for location based services network functions, such as the location management function (LMF). The LMF communicates with the GMLC to provide location based services including geographical locations of mobile devices operating on the 5G wireless telecommunication network. Thus, in order for a mobile network operator (MNO) to be able to support location based services customized to each tenant operating on a different slice of the network (multi-tenancy), a system for network slicing for multi-tenant location based services in a wireless telecommunication network is disclosed herein.

According to an example embodiment, for each tenant of a plurality of tenants of the wireless telecommunication network, the system electronically defines for the tenant, a respective network slice of the wireless telecommunication network for use by the tenant. The system then electronically associates the respective network slice with one or more location based services network functions or location based services systems of the wireless telecommunication network which provide geographical locations of mobile devices operating on the wireless telecommunication network. The system electronically defines customized location based services or location data, that are unique to the tenant, available from the one or more location based services network functions or location based services systems. The system then electronically maps the customized location services or location data available from the one or more location based services network functions or location based services systems to the respective network slice defined for use by the tenant.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
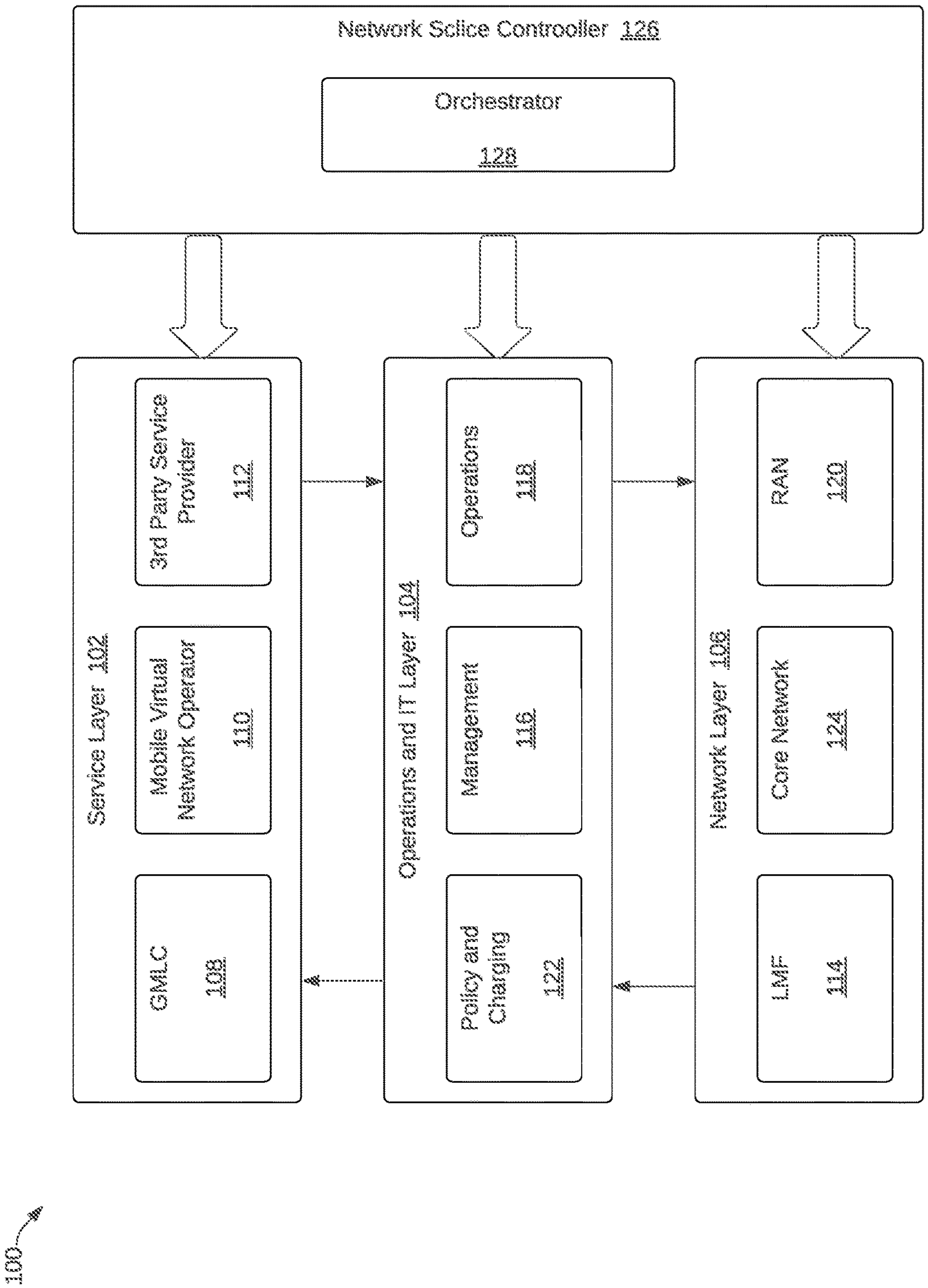
FIG. 1 illustrates a diagram of an example system architecture overview of a system for network slicing for multi-tenant location based services in a wireless telecommunication network in accordance with embodiments described herein.

FIG. 1 illustrates a diagram of an example system architecture overview of a system 100 for network slicing for multi-tenant location based services in a wireless telecommunication network in accordance with embodiments described herein.

The system 100 enables a mobile network operator (MNO) to be able to support location based services customized to each tenant operating on a different slice of the network (multi-tenancy). The system 100 is a multi-tier system with a service layer 102, operations and information technology (IT) layer 104 and network layer 106. Each of the service layer 102, operations and information technology (IT) layer 104 and network layer 106 contributes to the slice definition and deployment with distinct tasks. The service layer 102 may include the GMLC 108 that supports network slicing. The GMLC 108 interfaces with the LMF 114, with the tenants (e.g., enterprises and network business entities, such as mobile virtual network operators (MVNOs) 110) and with 3rd party service providers 112 that share the underlying physical network. The service layer 102 provides a unified vision of the service requirements. Each service is formally represented as a service instance, which embeds all the network characteristics in the form of service level agreement (SLA) requirements that are expected to be fully satisfied by a suitable slice creation.

The operations and IT layer 104 works with the network layer 106 to create each network slice for each tenant according to service instance requests coming from the upper layer. The operations and IT layer 104 includes policy and charging 122, which performs usage monitoring and governs the control plane functions via policy rules defined and user plane functions via policy enforcement. Management 116 and operations 118 include business support systems (BSS), which includes business and/or customer-facing functionality and operations support systems (OSS), which include information processing systems used by network operators to manage the network.

The network layer includes the radio access network (RAN), which includes physical network infrastructure, radio access technology and network functions (NFs) that provide connection to the core network 124, which includes other NFs, such as the LMF 114 that supports network slicing. The NFs embody well-defined behaviors and interfaces. Multiple network functions, including the LMF, are placed over the virtual network infrastructure and chained together to create an end-to-end network slice instance that reflects the network characteristics requested by the service. The configuration of the network functions, including the LMF, are performed by means of a set of network operations 118 that allow management of their full life-cycle (from their placement when a slice is created to their de-allocation when the function provided is no longer needed). The network domain of the available resources includes a heterogeneous set of infrastructure components like data centers (storage and computation capacity resources), devices enabling network connectivity such as routers (networking resources) and base stations (radio bandwidth resources).

The network slice controller 126 is dedicated to the slice management and configuration of network slices that support customized multi-tenant location based services. In particular, the network slice controller 126 monitors and manages the functionalities between the service layer 102, operations and IT layer 104 and network layer 106 in order to efficiently coordinate the coexistence of multiple slices that each support customized multi-tenant location based services.

The network slice controller 126 includes a network orchestrator 128, which interfaces with the various functionalities performed by the service layer 102, operations and IT layer 104 and network layer 106 to coherently manage each slice request. The benefit of such network element is that it enables an efficient and flexible creation of network slices for multi-tenant location based services that can be reconfigured during their life cycles. Operationally, the network slice controller 126 is in charge of several tasks that provide a more effective coordination between the service layer 102, operations and IT layer 104 and network layer 106.

The network slice controller 128 provides end-to-end service management that includes mapping of the various service instances, including location based services involving the GMLC 108 and the LMF 114, expressed in terms of SLA requirements with suitable network functions capable of satisfying the service constraints. For example, the network slice controller 128 may map mobile device positioning data associated with each tenant to the respective specific network slice defined for the tenant, map business support system (BSS) data regarding location based services associated with each tenant to the respective specific network slice defined for the tenant, and map operation support system (OSS) data, including alarms and key performance indicators (KPIs), regarding location based services associated with each tenant to the respective specific network slice defined for the tenant.

The network slice controller 128 also provides virtualization of the physical network resources in order to simplify the resources management operations performed to allocate network functions, including the LMF 114. Furthermore, the network slice controller 128 provides slice life-cycle management that includes slice performance monitoring across all the three layers in order to dynamically reconfigure each slice to accommodate possible SLA requirements modifications specific to a particular slice (on a per slice basis), including, but not limited to: geographical positioning and location requirements, positioning and location analytics, artificial intelligence (AI) and machine learning (ML) positioning and location features (e.g., position and location prediction), location precision and accuracy requirements, location and positioning privacy, positioning and location based policy and charging rules, and other location based service requirements. Due to the complexity of the performed tasks which address different purposes, the network slice controller 126 may be composed by multiple orchestrators that independently manage a subset of functionalities of each layer. For example, the network slice orchestrator 128 may be a location based services orchestrator that independently manages functionalities of the LMF 114. To fulfill the service requirements, the various orchestration entities may coordinate with each other by exchanging high-level information about the state of the operations regarding the LMF 114 involved in the slice creation and deployment.

Figure 2:
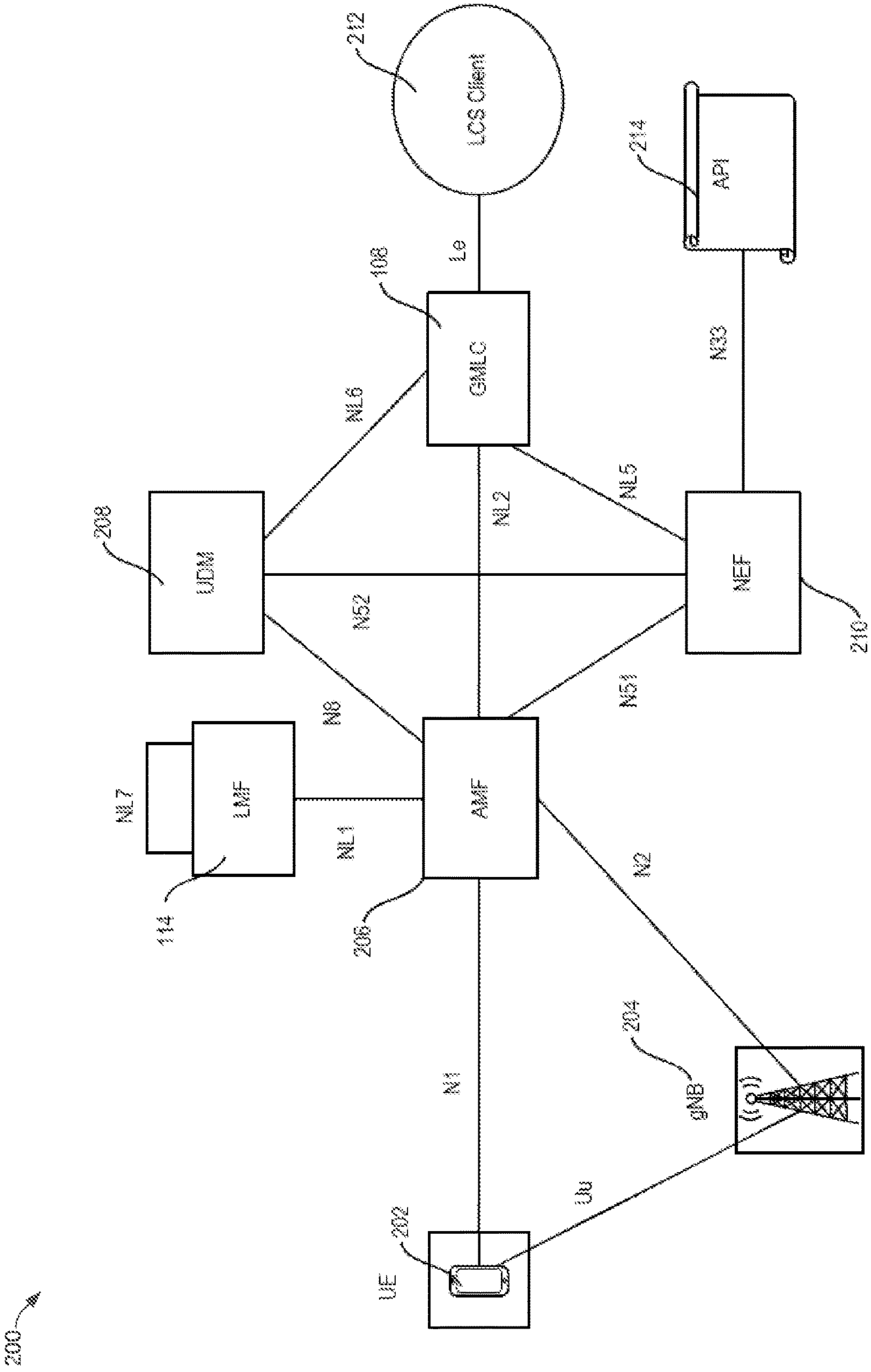
FIG. 2 illustrates a diagram of communication pathways between various cellular wireless telecommunication network functions and components of a system for network slicing for multi-tenant location based services in a wireless telecommunication network in accordance with embodiments described herein.

FIG. 2 illustrates a diagram of a 5G network 200 that includes communication pathways between various cellular wireless telecommunication network functions and components of the system 100 of FIG. 1 for network slicing for multi-tenant location based services in a wireless telecommunication network in accordance with embodiments described herein.

Shown in FIG. 2 is user equipment (UE) 202 of a tenant operating on a network slice that supports customized location based services using GMLC 108 and LMF 114. The network may include a 5G New Radio (5G NR) radio access network (RAN) that comprises of a set of radio base stations (each known as a Next Generation Node B (gNB), such as gNB 204, connected to the 5G core (5GC) and to each other via various 5G NR network functions, services and interfaces that may comprise the 5G core as shown in FIG. 2. 5G location service (LCS) is a technology in which a 5G network such as that shown in FIG. 2 determines the geographical location information of UE, such as UE 202, by measuring wireless signals. The wireless base station (e.g., gNB 204) is connected with the 5G core network based on the N2 interface and transmits location messages or measurements between the LMF 114 and base station nodes through the AMF 206 or between the LMF 114 and the UE 202. Operators may synchronously deploy the 5G location service to provide 5G network communication and location services for third-party customers, such as to LCS client 212.

The wireless base station (gNB 204) is connected with the 5G core network based on the N2 interface and transmits location messages between the LMF 114 and base station nodes, such as gNB 204, through the Access & Mobility Management Function (AMF) 206. The AMF 206 performs registration management, reachability management, connection management and mobility.

Also shown are the Unified Data Management (UDM) service 208 that manages user data and the Network Exposure Function (NEF) 210. The NEF 210 is responsible for managing the external open network data. External applications that want to access the internal data of the 5G core pass through the NEF 210. In an example embodiment, an API 214 of an external location based services application may access positioning and location data associated with the UE 202 (e.g., geographical location of the UE) through NEF 210 via interface N33 according to the location policy and charging rules specific to the network slice on which the UE 202 is operating. Such positioning and location data associated with the UE 202 may be provided by the LMF 114 according to the policy and charging rules specific to the network slice on which the UE 202 is operating.

Also, an LCS client 212 may request location based services and data associated with the UE 202 (e.g., geographical location of the UE) from GMLC 108 according to the policy and charging rules specific to the network slice on which the UE 202 is operating. The GMLC 108 may then obtain such data from the LMF 114 according to the policy and charging rules specific to the network slice on which the UE 202 is operating and respond to the request using such data. For example, such services provided by the system 100 may include a “Precision Location Service” (PLS) operating with an architecture of the network 200 shown in FIG. 2 that provides accurate device location information for different use cases according to customized location based services or location data defined specifically for the slice on which the UE 202 of the tenant is operating (i.e., on a per slice basis). Such use cases for which accurate device location information is provided specifically for the slice on which the UE 202 of the tenant is operating may include, but are not limited to: regulatory services (tracking location of a target device for law enforcement), enterprises and private networks of the tenant; enterprises other than the MNO providing the PLS.

The PLS architecture of the network 200 shown in FIG. 2 supports multi-tenancy. In an example embodiment, each tenant receives the positioning service based on a certain set of policy and charging rules defined between the MNO of network 200 providing the PLS and each specific tenant. In various embodiment, these policies may include access to PLS analytics features and capabilities, may have access to the tenant specific positioning data; may have access to the tenant specific BSS data; and may receive their own specific OSS alarms and key performance indicators (KPIs). For example, a regulatory services tenant of network 200 may not need extreme position and/or location accuracy for location tracking, but a factory tenant of network 200 may request and receive, via the PLS, position and/or location accuracy to the centimeter level. Thus, a regulatory services tenant of network 200 (e.g., law enforcement) may be operating on a first slice of network 200 for which location based services are provided that enable location tracking of the UE 202 via GMLC 108 and LMF 114 at a medium amount of accuracy, while a factory tenant is operating on a second slice of network 200 for which location based services are provided via GMLC 108 and LMF 114 that enable location tracking of factory robots to centimeter-level accuracy. The regulatory services tenant and the factory tenant may receive their own specific OSS alarms and KPIs regarding operations and performance of the customized location based services.

Figure 3:
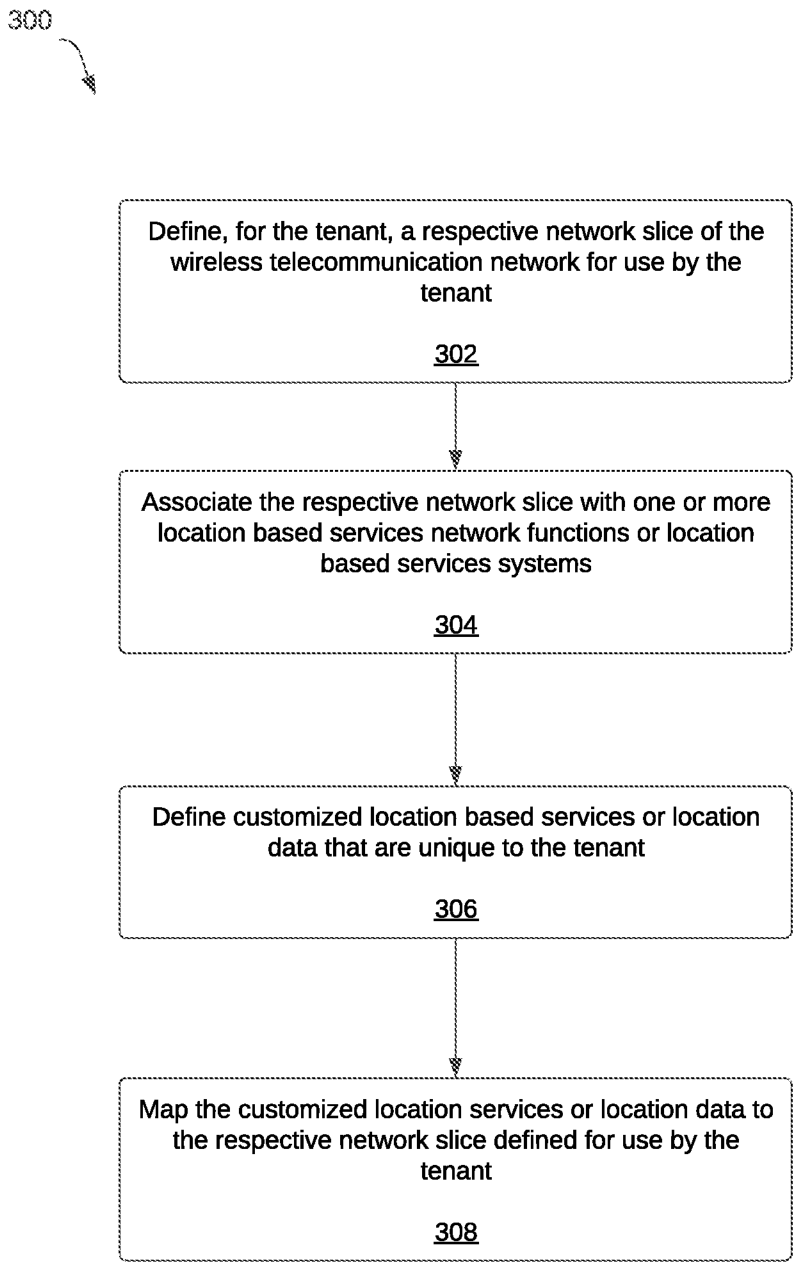
FIG. 3 illustrates a logical flow diagram showing an example embodiment of a process for providing customized location based services to a tenant in accordance with embodiments described herein.

FIG. 3 illustrates a logical flow diagram showing an example embodiment of a process 300 for providing customized location based services to a tenant in accordance with embodiments described herein.

At 302, for each tenant of a plurality of tenants of the wireless telecommunication network, the system 100 electronically defines for the tenant, a respective network slice of the wireless telecommunication network for use by the tenant.

At 304, the system 100 electronically associates the respective network slice with one or more location based services network functions or location based services systems of the wireless telecommunication network which provide geographical locations of mobile devices operating on the wireless telecommunication network. In an example embodiment, this may include electronically associating the respective network slice with a Gateway Mobile Location Centre (GMLC) gateway node of the wireless telecommunication network for providing for location based services to a location services (LCS) client. The system 100 also electronically associates the respective network slice with a location management function (LMF) of the wireless telecommunication network that communicates with the GMLC to provide location based services including geographical locations of mobile devices operating on the wireless telecommunication network.

At 306, the system 100 electronically defines customized location based services or location data, that are unique to the tenant, available from the one or more location based services network functions or location based services systems. This may include electronically defining policy and charging rules regarding location based services specific for the tenant to be implement on the respective network slice defined for that tenant that are different than policy and charging rules related to location based services specific for other tenants of the plurality of tenants. The policy and charging rules regarding location based services specific for the tenant to be implement on the respective network slice defined for that tenant may include analytics features and capabilities regarding location based services specific for the tenant to be implement on the respective network slice defined for that tenant.

At 308, the system 100 electronically maps the customized location services or location data available from the one or more location based services network functions or location based services systems to the respective network slice defined for use by the tenant.

Figure 4:
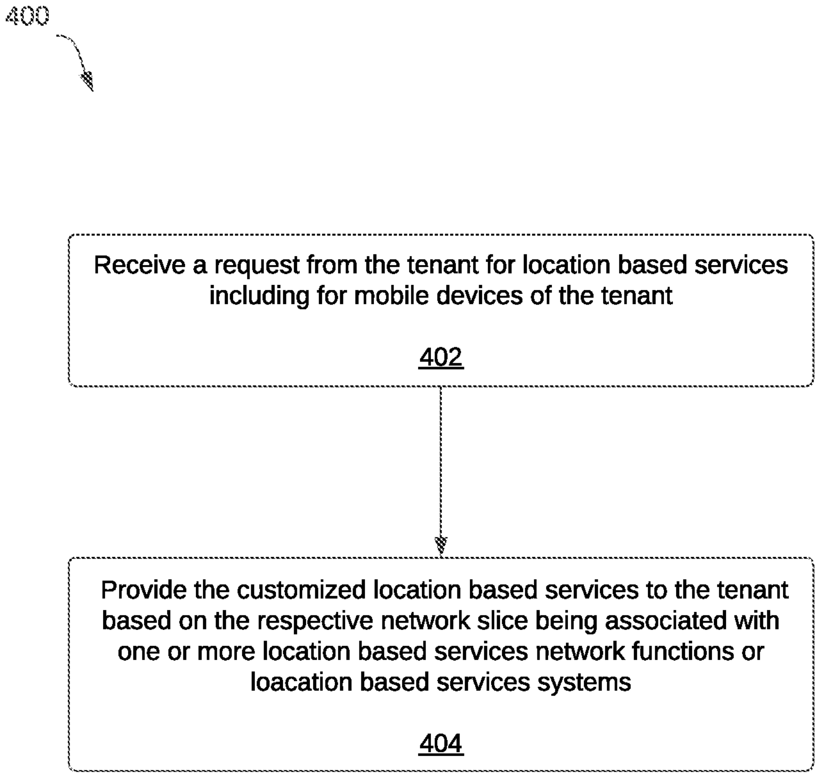
FIG. 4 illustrates a logical flow diagram showing an example embodiment of a process for multi-tenant location based services in a wireless telecommunication network in accordance with embodiments described herein.

FIG. 4 illustrates a logical flow diagram showing an example embodiment of a process 400 for multi-tenant location based services in a wireless telecommunication network in accordance with embodiments described herein.

At 402, for each tenant of the plurality of tenants of the wireless telecommunication network, the system 100 electronically receives a request from the tenant for location based services including for geographical locations of mobile devices of the tenant operating on the respective network slice defined for the tenant.

At 404, the system 100, in response to the request, electronically provides the customized location based services to the tenant based on the respective network slice being associated with one or more location based services network functions or location based services systems of the wireless telecommunication network which provide geographical locations of mobile devices operating on wireless telecommunication network.

Figure 5:
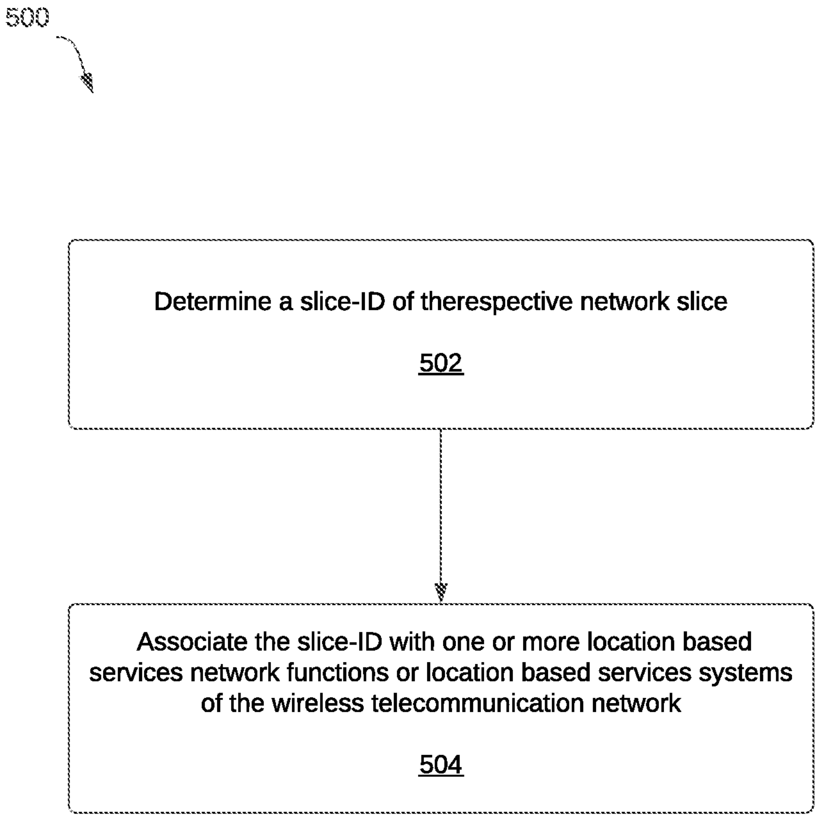
FIG. 5 illustrates a logical flow diagram showing an example embodiment of a process for associating the respective network slice with one or more location based services in accordance with embodiments described herein.

FIG. 5 illustrates a logical flow diagram showing an example embodiment of a process 500 for associating the respective network slice with one or more location based services in accordance with embodiments described herein.

At 502, the system 100 electronically determines a slice-ID of the respective network slice. In an example embodiment, the slice-ID includes Single Network Slice Selection Assistance Information (S-NSSAI) of the respective network slice.

At 504, the system 100 electronically associates the slice-ID of the respective network slice with the one or more location based services network functions or location based services systems of the wireless telecommunication network which provide geographical locations of mobile devices operating on wireless telecommunication network.

Figure 6:
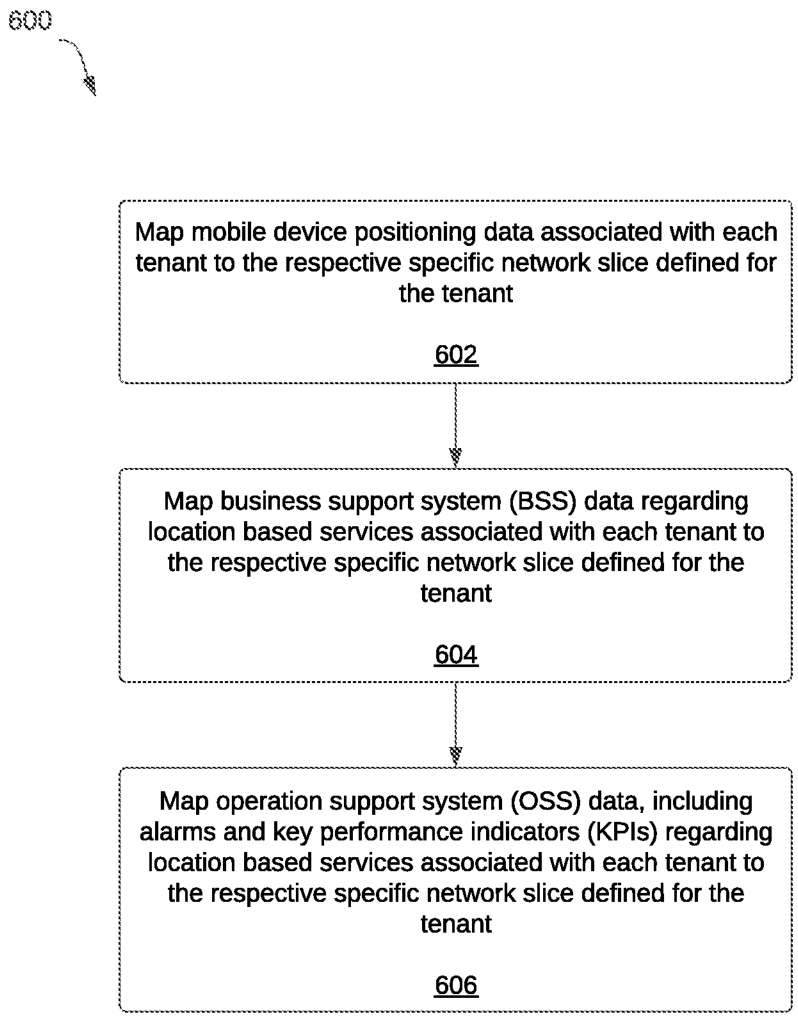
FIG. 6 illustrates a logical flow diagram showing an example embodiment of a process for mapping the customized location services or location data to a respective network slice in accordance with embodiments described herein.

FIG. 6 illustrates a logical flow diagram showing an example embodiment of a process 600 for mapping the customized location services or location data to a respective network slice in accordance with embodiments described herein.

At 602, the system 100 electronically maps mobile device positioning data associated with each tenant to the respective specific network slice defined for the tenant.

At 604, the system 100 electronically maps business support system (BSS) data regarding location based services associated with each tenant to the respective specific network slice defined for the tenant.

At 606, the system 100 electronically maps operation support system (OSS) data, including alarms and key performance indicators (KPIs), regarding location based services associated with each tenant to the respective specific network slice defined for the tenant.

Figure 7:
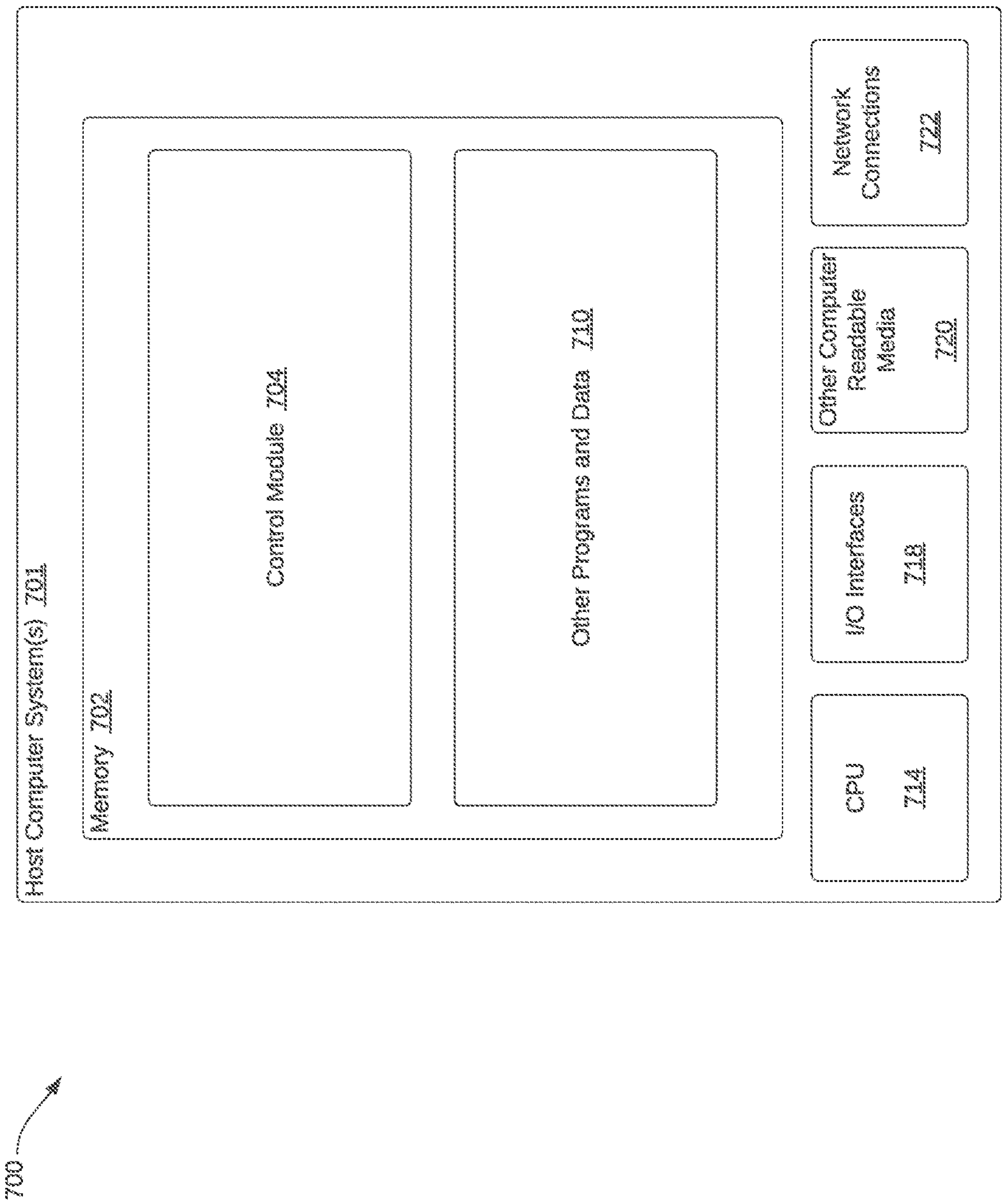
FIG. 7 shows a system diagram that describes an example implementation of an underlying computing system for implementing embodiments described herein.

FIG. 7 shows a system diagram that describes an example implementation of underlying computing system(s) 701 for implementing embodiments described herein.

The functionality described herein for network slicing for multi-tenant location based services in a wireless telecommunication network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 7 illustrates an example of underlying hardware on which such software and functionality may be hosted and/or implemented.

In particular, shown is example host computer system(s) 701. For example, such computer system(s) 701 may represent one or more of those in various data centers, base stations and cell sites shown and/or described herein that are, or that host or implement the functions of: routers, components, microservices, PODs, containers, nodes, node groups, control planes, clusters, virtual machines, NFs, and other aspects described herein for network slicing for multi-tenant location based services in a wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for network slicing for multi-tenant location based services in a wireless telecommunication network. Memory 702 may also store other programs and data 710, which may include rules, databases, application programming interfaces (APIs), policy and charging rules and data, OSS data, BSS data, software containers, nodes, pods, clusters, node groups, control planes, software defined data centers (SDDCs), microservices, virtualized environments, software platforms, cloud computing service software, network management software, network orchestrator software, one or more network slicing controllers, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include location data interfaces, sensor data interfaces, global positioning system (GPS) interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for network slicing for multi-tenant location based services in a wireless telecommunication network, the method comprising:

for each tenant of a plurality of tenants of the wireless telecommunication network:

electronically defining, for the tenant, a respective network slice of the wireless telecommunication network for use by the tenant;

electronically associating the respective network slice with one or more location based services network functions or location based services systems of the wireless telecommunication network which provide geographical locations of mobile devices operating on the wireless telecommunication network;

electronically defining customized location based services or location data, that are unique to the tenant, available from the one or more location based services network functions or location based services systems;

electronically mapping the customized location services or location data available from the one or more location based services network functions or location based services systems to the respective network slice defined for use by the tenant;

electronically receiving a request from the tenant for location based services, the location based services including providing geographical locations of mobile devices of the tenant operating on the respective network slice defined for the tenant; and in response to the request, electronically providing the customized location based services to the tenant based on the respective network slice being associated with one or more location based services network functions or location based services systems of the wireless telecommunication network which provide geographical locations of mobile devices operating on the wireless telecommunication network.

2. The method of claim 1 wherein the associating the respective network slice with the one or more location based services network functions or location based services systems of the wireless telecommunication network which provide geographical locations of mobile devices operating on wireless telecommunication network includes:

electronically determining a slice-ID of the respective network slice; and electronically associating the slice-ID of the respective network slice with the one or more location based services network functions or location based services systems of the wireless telecommunication network which provide geographical locations of mobile devices operating on wireless telecommunication network.

3. The method of claim 2 wherein the electronically defining customized location based services or location data, that are unique to the tenant, available from the one or more location based services network functions or location based services systems includes:

a Gateway Mobile Location Centre (GMLC) gateway node of the wireless telecommunication network supporting network slicing using the slice-ID, wherein the slice-ID includes Single Network Slice Selection Assistance Information (S-NSSAI) of the respective network slice; and a location management function (LMF) of the wireless telecommunication network supporting network slicing using the S-NSSAI.

4. The method of claim 2 wherein the slice-ID includes Single Network Slice Selection Assistance Information (S-NSSAI) of the respective network slice.

5. The method of claim 1 wherein the defining customized location based services or location data available from the one or more location based services network functions or location based services systems and that are unique to the tenant includes:

electronically defining policy and charging rules regarding location based services specific for the tenant to be implement on the respective network slice defined for that tenant that are different than policy and charging rules related to location based services specific for other tenants of the plurality of tenants.

6. The method of claim 5 wherein the policy and charging rules regarding location based services specific for the tenant to be implement on the respective network slice defined for that tenant include analytics features and capabilities regarding location based services specific for the tenant to be implement on the respective network slice defined for that tenant.

7. The method of claim 1 wherein the mapping the customized location services or location data available from the one or more location based services network functions or location based services systems to the respective network slice defined for use by the tenant includes:

electronically mapping mobile device positioning data associated with each tenant to the respective specific network slice defined for the tenant.

8. The method of claim 1 wherein the mapping the customized location services or location data available from the one or more location based services network functions or location based services systems to the respective network slice defined for use by the tenant includes:

electronically mapping business support system (BSS) data regarding location based services associated with each tenant to the respective specific network slice defined for the tenant.

9. The method of claim 1 wherein the mapping the customized location services or location data available from the one or more location based services network functions or location based services systems to the respective network slice defined for use by the tenant includes:

electronically mapping operation support system (OSS) data, including alarms and key performance indicators (KPIs), regarding location based services associated with each tenant to the respective specific network slice defined for the tenant.

10. The method of claim 1 wherein the electronically associating the respective network slice with one or more location based services network functions or location based services systems of the wireless telecommunication network which provide geographical locations of mobile devices operating on wireless telecommunication network includes:

electronically associating the respective network slice with a Gateway Mobile Location Centre (GMLC) gateway node of the wireless telecommunication network for providing for location based services to a location services (LCS) client; and electronically associating the respective network slice with a location management function (LMF) of the wireless telecommunication network that communicates with the GMLC to provide location based services including geographical locations of mobile devices operating on the wireless telecommunication network.

11. A system for network slicing for multi-tenant location based services in a wireless telecommunication network, the system comprising:

at least one memory that stores computer executable instructions; and at least one processor that executes the computer executable instructions to cause actions to be performed, the actions including:

for each tenant of a plurality of tenants of the wireless telecommunication network:

electronically defining, for the tenant, a respective network slice of the wireless telecommunication network for use by the tenant;

electronically associating the respective network slice with one or more location based services network functions or location based services systems of the wireless telecommunication network which provide geographical locations of mobile devices operating on the wireless telecommunication network;

electronically defining customized location based services or location data, that are unique to the tenant, available from the one or more location based services network functions or location based services systems;

electronically mapping the customized location services or location data available from the one or more location based services network functions or location based services systems to the respective network slice defined for use by the tenant;

electronically receiving a request from the tenant for location based services, the location based services including providing geographical locations of mobile devices of the tenant operating on the respective network slice defined for the tenant; and in response to the request, electronically providing the customized location based services to the tenant based on the respective network slice being associated with one or more location based services network functions or location based services systems of the wireless telecommunication network which provide geographical locations of mobile devices operating on the wireless telecommunication network.

12. The system of claim 11 wherein the associating the respective network slice with the one or more location based services network functions or location based services systems of the wireless telecommunication network which provide geographical locations of mobile devices operating on wireless telecommunication network includes:

electronically determining a slice-ID of the respective network slice; and electronically associating the slice-ID of the respective network slice with the one or more location based services network functions or location based services systems of the wireless telecommunication network which provide geographical locations of mobile devices operating on wireless telecommunication network.

13. The system of claim 12 wherein the electronically defining customized location based services or location data, that are unique to the tenant, available from the one or more location based services network functions or location based services systems includes:

a Gateway Mobile Location Centre (GMLC) gateway node of the wireless telecommunication network supporting network slicing using the slice-ID, wherein the slice-ID includes Single Network Slice Selection Assistance Information (S-NSSAI) of the respective network slice; and a location management function (LMF) of the wireless telecommunication network supporting network slicing using the S-NSSAI.

14. The system of claim 13 wherein the slice-ID includes Single Network Slice Selection Assistance Information (S-NSSAI) of the respective network slice.

15. The system of claim 11 wherein the defining customized location based services or location data available from the one or more location based services network functions or location based services systems and that are unique to the tenant includes:

electronically defining policy and charging rules regarding location based services specific for the tenant to be implement on the respective network slice defined for that tenant that are different than policy and charging rules related to location based services specific for other tenants of the plurality of tenants.

16. A non-transitory computer-readable storage medium having computer-executable instructions stored thereon that, when executed by at least one processor, cause the at least one processor to cause actions to be performed, the actions including:

for each tenant of a plurality of tenants of a wireless telecommunication network:

electronically defining, for the tenant, a respective network slice of the wireless telecommunication network for use by the tenant;

electronically associating the respective network slice with one or more location based services network functions or location based services systems of the wireless telecommunication network which provide geographical locations of mobile devices operating on the wireless telecommunication network;

electronically defining customized location based services or location data, that are unique to the tenant, available from the one or more location based services network functions or location based services systems;

electronically mapping the customized location services or location data available from the one or more location based services network functions or location based services systems to the respective network slice defined for use by the tenant;

electronically receiving a request from the tenant for location based services, the location based services including providing geographical locations of mobile devices of the tenant operating on the respective network slice defined for the tenant; and in response to the request, electronically providing the customized location based services to the tenant based on the respective network slice being associated with one or more location based services network functions or location based services systems of the wireless telecommunication network which provide geographical locations of mobile devices operating on the wireless telecommunication network.

17. The method of claim 16 wherein the associating the respective network slice with the one or more location based services network functions or location based services systems of the wireless telecommunication network which provide geographical locations of mobile devices operating on wireless telecommunication network includes:

electronically determining a slice-ID of the respective network slice; and electronically associating the slice-ID of the respective network slice with the one or more location based services network functions or location based services systems of the wireless telecommunication network which provide geographical locations of mobile devices operating on wireless telecommunication network.

* * * * *